United States Patent
Irle et al.

(10) Patent No.: US 6,366,078 B1
(45) Date of Patent: Apr. 2, 2002

(54) INDUCTIVE ANGLE SENSOR WITH A PLURALITY OF RECEIVING COILS AND AN EVALUATION CIRCUIT

(75) Inventors: Henning Irle, Lippstadt; Norbert Kost, Geseke; Franz-Josef Schmidt, Salzkotten, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/148,704

(22) Filed: Sep. 4, 1998

(30) Foreign Application Priority Data

Sep. 5, 1997 (DE) .......................................... 197 38 839

(51) Int. Cl.[7] ................................................. G01B 7/30
(52) U.S. Cl. ............................ 324/207.17; 324/207.12; 324/207.25; 702/151
(58) Field of Search .......... 324/207.12, 207.16–207.19, 324/207.25, 163, 165, 166, 173; 702/145, 151; 318/659–661; 336/45, 130

(56) References Cited

U.S. PATENT DOCUMENTS

| 4,450,403 A |   | 5/1984  | Dreiseitl et al. |
|-------------|---|---------|------------------|
| 4,652,821 A | * | 3/1987  | Kreft ................ 324/207.17 X |
| 4,680,721 A |   | 7/1987  | Pluddemann |
| RE32,857 E  |   | 2/1989  | Luneau |
| 5,241,368 A | * | 8/1993  | Lee .................... 324/207.17 X |
| 5,535,142 A | * | 7/1996  | Mehnert ............ 324/207.17 X |
| 5,994,896 A | * | 11/1999 | Andreas et al. ........ 324/207.17 |

FOREIGN PATENT DOCUMENTS

| DE | 3218101 A     | 11/1983 |
| DE | 37 44 293 A1  | 7/1988  |
| DE | 42 24 225 C2  | 1/1994  |
| EP | 0 059 244 A2  | 9/1982  |
| EP | 0554900 A     | 11/1983 |
| EP | 0 159 191     | 10/1985 |
| EP | 0320596 A     | 6/1989  |

* cited by examiner

*Primary Examiner*—Gerard R. Strecker
(74) *Attorney, Agent, or Firm*—Birch, Stewart, Kolasch & Birch, LLP

(57) ABSTRACT

An inductive angle sensor with an exciting coil and several receiving coils displaced with respect to each other by a predetermined angle. A rotor element, a position of which is to be determined by the angle sensor, has an inductive coupling element that couples signals into the receiving coils which are essentially sinusoidally affected by the position of the rotor element. Output signals of various receiving coils are phase-shifted with respect to each other. In order to establish a linear interrelationship between the position of the rotor element and the sensor output signals, on the one hand, and to achieve a greatest possible measurement accuracy, on the other hand, the angle sensor has a selection device that selects to evaluate a respective output signal whose nearly linear part of its sine function is in a vicinity of its zero crossing.

8 Claims, 3 Drawing Sheets

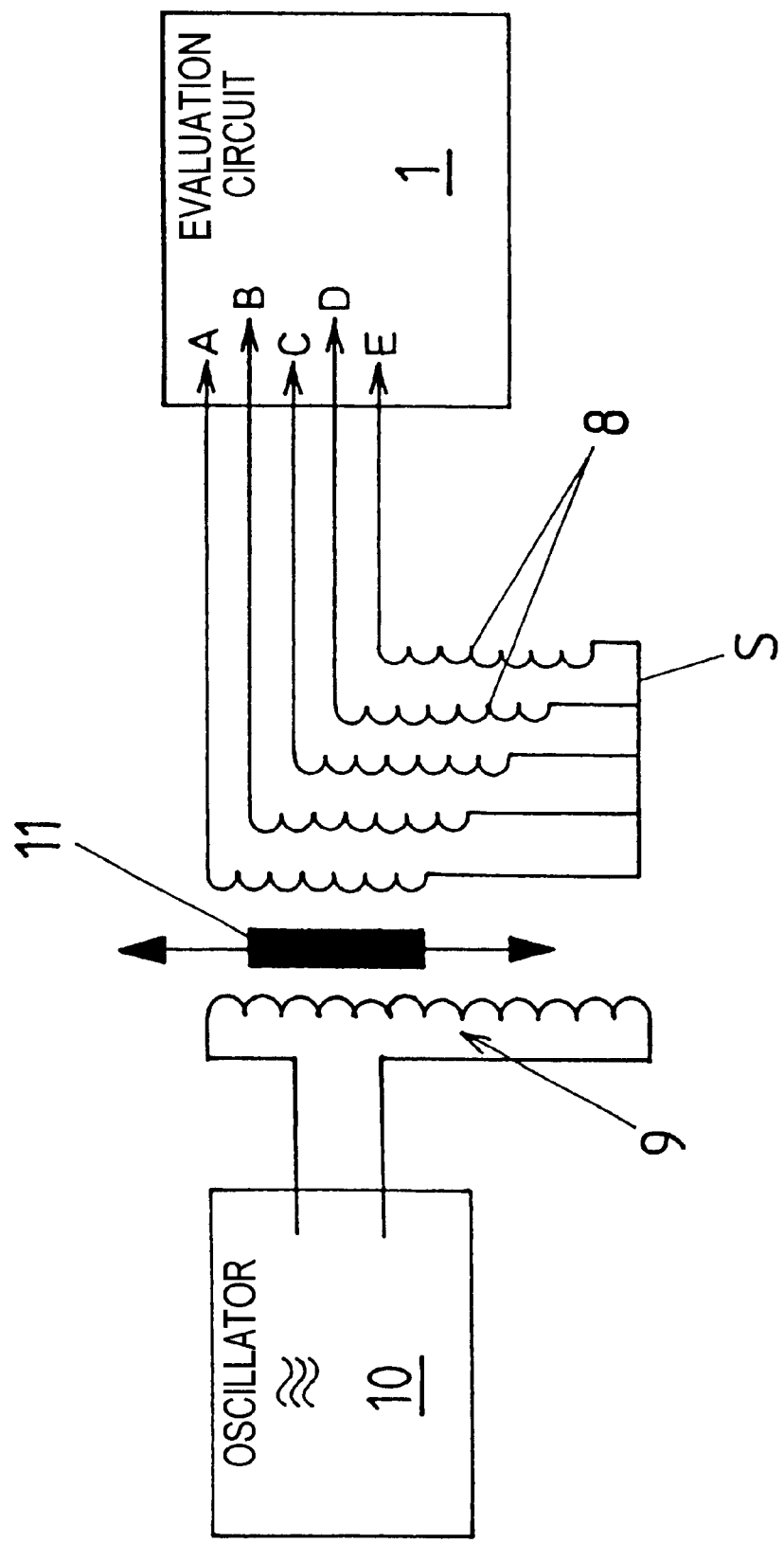

INDUCTIVE ANGLE SENSOR WITH A PLURALITY OF RECEIVING COILS AND AN EVALUATION CIRCUIT

BACKGROUND OF THE INVENTION

This invention relates to an inductive angle sensor including: a stator element, having an exciting coil with a periodic AC voltage applied thereto and several receiving coils spaced from one another by a predetermined angle; a rotor element arranged to be movable relative to the stator element that affects an inductive coupling between the exciting coil and the receiving coils with an inductive coupling element as a function of the rotor element's position relative to the stator element; and an evaluation circuit for determining positions of the rotor element from output signals of the receiving coils. This invention further concerns a process for evaluating the positions of such a rotor element.

In such an angle sensor, each receiving coil generates an output signal that depends substantially-sinusoidally on the position of the rotor element.

If a linear interrelationship is to be established between the output signals of the receiving coils and the position of the rotor element, signal processing becomes quite expensive, or measuring accuracy is reduced.

It is an object of this invention to provide an inductive angle sensor that, in an uncomplicated manner, generates a sensor output signal from essentially sinusoidal output signals of the receiving coils that is linearly related to positions of the rotor element. Additionally, a very simple evaluation process is provided, with which an angle sensor structured according to the invention functions. In this process, as high a degree of measuring accuracy as possible is achieved, and measuring inaccuracies due to component tolerances of the angle sensor are largely offset, or compensated.

SUMMARY OF THE INVENTION

According to principles of this invention, an evaluation circuit of an inductive angle sensor of the type described in the opening paragraph above has a selection device that selects at least one of output signals of receiving coils depending on momentary values of these output signals, and wherein the evaluation circuit determines a momentary position of a rotor element from a value of the at least one output signal.

As previously indicated, a change in position of the rotor element generates output signals in the receiving coils, the values of which (e.g. voltage values) substantially-sinusoidally depend on the position of the rotor element. In order to establish a linear inter-relationship between the position of the rotor element and a sensor output signal in a simple manner, an evaluation circuit of an angle sensor of this invention utilizes a nearly linear range about a zero crossing of a respective sine-wave function for evaluation purposes.

Since several receiving coils are provided that are offset with respect to each other by a predetermined angle, the evaluation circuit has a selection device that respectively selects output signals of receiving coils that are passing through the range of the zero crossing of the sine-wave function at that time.

A total measuring range of the angle sensor according to the invention is thus subdivided into several equal measuring sections, in each of which the output signal changes nearly linearly between a lower signal value and an upper signal value.

In such a process, the lower and upper signal values are the same for each measuring section so that, advantageously, elements of the evaluation circuit, specifically an analog digital converter provided for evaluation, can be structured precisely for that range of output signals.

BRIEF DESCRIPTION OF THE DRAWINGS

The invention is described and explained in more detail below using an embodiment shown in the drawings. The described and drawn features of the invention can be used individually or in preferred combinations in other embodiments. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 3 is a block/schematic wiring diagram illustrating general operating principles of an inductive angle sensor.

DESCRIPTION OF THE PREFERRED EMBODIMENT

Figure 1:
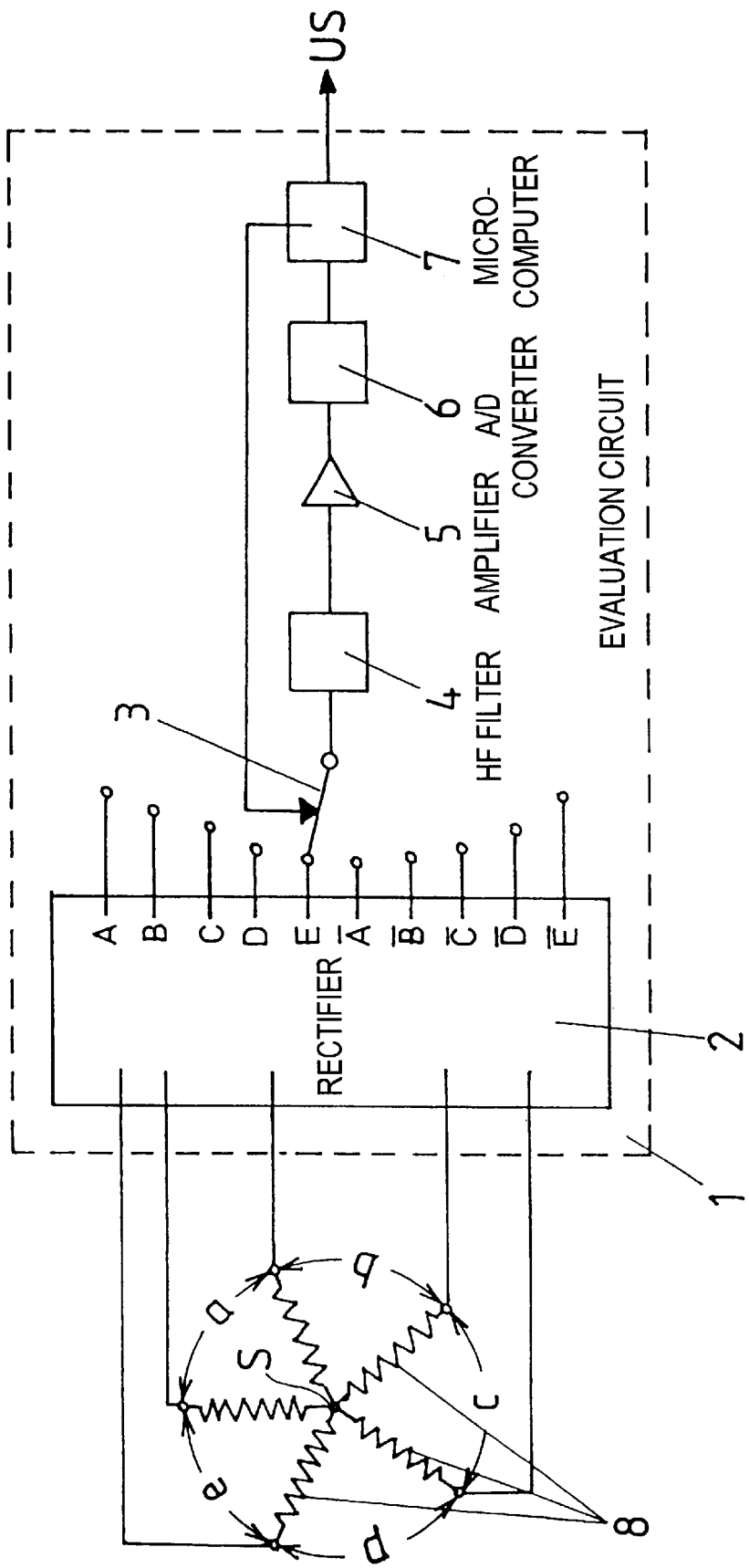
FIG. 1 is block/schematic wiring diagram of a receiving-coil arrangement and an evaluation circuit of an inductive angle sensor of this invention.

First, general operating principles of a possible embodiment of an inductive angle sensor will be explained with reference to FIG. 3.

An exciting coil 9 and several receiving coils 8, five in this example, are positioned on a stator element (not shown). The receiving coils 8 are arranged spaced from one another, indeed in an actual embodiment by predetermined equal angles across a measuring range. The receiving coils 8 shown here, one next to the other, are placed on a multilayer printed circuit board, for example, and are structured as strip, or track, conductors wound around a circumference of a circle.

One connection of each receiving coil, respectively, is connected to a common summation point S, while the other connection is respectively connected to an input of an evaluation circuit 1.

An oscillator 10 applies a high-frequency AC signal to the exciting coil 9, which is coupled into the receiving coils 8 via an inductive coupling element 11 that is part of a rotor element (not shown).

Because the receiving coils 8 are offset with respect to each other, differing output signals A through E of the receiving coils are applied to the evaluation circuit 1, from which signals the evaluation circuit 1 determines a position of the rotor element, or the inductive coupling element 11, relative to the stator element.

Structural principles of the evaluation circuit will be explained in further detail, using FIG. 1.

FIG. 1 shows an arrangement of the five receiving coils 8, less from a geometrical than from an electrical perspective. Because of the uniformly-spaced arrangement of the five receiving coils along a measuring range, voltages induced in the receiving coils, as well as lead voltages a, b, c, d, e that can be measured between the coils, are phase shifted 72° with respect to each other. This is comparable to a coil arrangement of a five-phase AC generator with the summation point S as the star point. The geometric angular offset between the receiving coils does not necessarily have to be 72°, since the coil arrangement could cover a partial section of a circle.

The lead voltages a–e are sent to a rectifier 2 that is part of the evaluation circuit 1. Through rectification, preferably with particularly-linearly functioning analog switches, high frequency portions of the receiving-coil signals are eliminated. The remaining receiving-coil output signals A through E thus correspond to envelope curves of the lead voltages a through e, and contain only sinusoidal dependencies on the position of the rotor element (not shown).

The output signals A–E and the electrically inverted (pole reversed) output signals $\overline{A}$–$\overline{E}$ are sent to a controllable selection device 3 that is, in turn, technically realized by analog switches that are illustrated in FIG. 1 in a simplified schematic manner as a change-over switch. One of the output signals A through E and the inverted output signals $\overline{A}$ through $\overline{E}$ is respectively connected to an analog digital converter 6, by the selection device, through an HF filter 4 that removes any remaining high-frequency portions of the output signals, and through an amplifier 5. A specific task of the amplifier 5 in this process is to adjust a level of the output signals to a conversion range of the analog digital converter 6. The analog digital converter 6, in turn, sends its digitized output signal to a microcomputer 7, which first calculates and outputs a sensor output signal corresponding to the position of the rotor element, and also further controls the selection device 3. In this process, the microcomputer 7 specifically determines which of the output signals A through E and inverted output signals A through E is to be respectively evaluated.

An evaluation principle upon which the invention is based will be explained in further detail below, with reference to FIG. 2.

Figure 2:
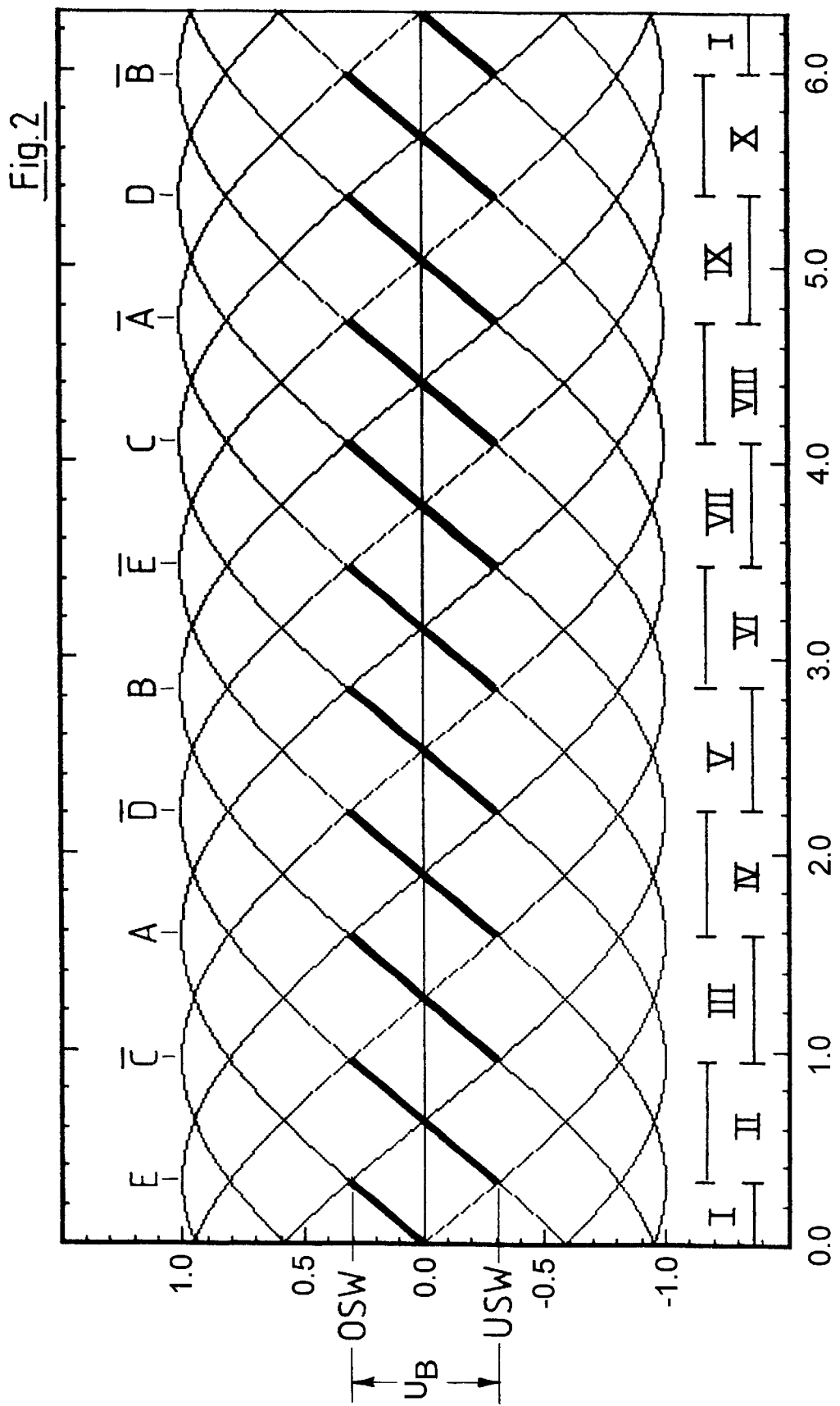
FIG. 2 is a plot of receiving-coil output signals, as well as inverted receiving-coil output signals, applied to a selection device.

FIG. 2 qualitatively shows plots of the output signals A through E and inverted output signals $\overline{A}$ through $\overline{E}$ that are applied to the selection device 3. The phase positions of the individual signals are plotted with respect to the others, with the abscissa being marked in radian measure units. The plots of the output signals are shown here as being without dimensions, but in a sine-wave value range which can be multiplied by a voltage value for concrete figures.

Sections, of the sine curves, that have the smallest rise in voltage values, those values closest to zero, on both sides are shown in bold. In this way, 10 equal linear measuring sections I through X having voltage rises are obtained across the measuring range, which the evaluation circuit uses for determining position. As can be seen in FIG. 2, when one linear section stops at a radian position along the abscissa another starts, and they are equal in length.

Each measuring section I–X extends from a lower signal value USW up to an upper signal value OSW, which is equally sized for each measuring section. This is advantageous because in this way, an amplification factor of the amplifier 5 shown in FIG. 1 can be selected such that a signal difference $U_B$ between the upper signal value and the lower signal value times the amplification factor corresponds exactly to the conversion range of the analog digital converter 6, so that the analog digital converter achieves its best possible resolution in each measuring section.

The output signal that is sent to the analog digital converter 6, and thus also the converter's digitized output signal, is a measure of at which-point within a measuring section I through X a position to be determined is located.

In order to determine an exact overall position, the number of measuring sections n already passed through must then still be added.

Since the microcomputer 7, upon reaching an upper signal value, switches forward to the output signal of the next measuring section, or correspondingly, upon reaching a lower signal value, switches back to the output signal belonging to the previous measuring section, the microcomputer 7 merely counts the number of measuring sections passed through by counting the change-overs performed.

The microcomputer can easily calculate a sensor output signal US corresponding to a position of the rotor element by multiplying the number of measuring sections run through, n, by the signal difference $U_B$ of each measuring range ($U_B$=OSW−USW), plus the measured signal value $U_n$, in the measuring section currently being measured.

In this simple manner, a sensor output signal is obtained that depends nearly linearly on the position of the rotor element. An additional particular advantage of this process is that by subdividing the measuring range into measuring sections, the accuracy of determining the position, which is -otherwise limited by the accuracy of an analog digital converter, can be increased by a factor of the number of subdivisions.

A particularly high degree of measuring accuracy of the angle sensor of this invention is achieved in that the entire measuring range is subdivided into a number of measuring sections.

It is advantageous to utilize the inverted, i.e. pole reversed, output signals of the receiving coils in addition to the output signals of the receiving coils, for evaluation purposes. The number of measuring sections is equal to twice the number of receiving coils in this manner.

To this end, however, an odd number of receiving coils must be provided, since, when the number of receiving coils is even, each inverted-receiving-coil signal, pair-wise, is identical with an original receiving-coil signal, and the number of measuring sections is thus not doubled, but remains equal to the number of receiving coils.

Also part of the evaluation circuit in addition to the selection device is the rectifier, the task of which is to filter out the high-frequency AC portion of the receiving-coil signals that is coupled from the signal of the exciting coil. The sinusoidal, position-dependent output signal thus appears as an envelope curve of the original receiving-coil signal. The rectifier as well as the switching device can thereby be realized in a particularly uncomplicated and advantageous manner in the form of analog switches.

It is further advantageous to attach one connection of each receiving coil to a common summation point. Since one connection wire to the evaluation circuit can be saved in this manner, a number of receiving coils can be increased while maintaining the same receiving-coil density, whereby the number of measuring sections, and thus an accuracy of the sensor output signal, can be further increased.

It is also advantageous to provide an analog digital converter as well as a microcomputer. The microcomputer calculates the sensor output signal of the angle sensor on the one hand, and on the other hand controls the selection device based on the value of the digitized output signal sent to it, specifically by switching to the analog digital converter a smallest respective output signal by value with a positive voltage rise for a predetermined direction of motion of the rotor element.

A sequence of the output signals to be selected for this purpose is predetermined for each direction of motion of the rotor element, and varies, in each case, cyclically.

Furthermore it is particularly advantageous for evaluation to select two sequentially adjacent output signal values, and to establish a proportionate relation between them. In this way, inaccuracies in the sensor output signal that are caused by tolerances in the arrangement of the exciting coil and the receiving coils with respect to each other (distance variations, offset angles) can be easily and effectively offset.

The invention claimed is:

1. An inductive angle sensor with a stator element having an exciting coil for having a periodic AC voltage applied thereto and several receiving coils displaced with respect to each other by a predetermined angle, and with a rotor element positioned near the stator element so that it can move and thereby affect an inductive coupling between the exciting and receiving coils as a function of its position relative to the stator element, and an evaluation circuit for determining a position of the rotor element from output signals (A, B, C, D, E) of the receiving coils, wherein the evaluation circuit has a selection device that selects a particular at least one of the output signals depending on a momentary value of at least one of the output signals, and wherein the evaluation circuit determines a momentary position of the rotor element using the value of the particular at least one of the output signals; wherein the angle sensor has an odd number of receiving coils and wherein an input portion of the evaluation circuit feeds reversed polarity output signals ($\overline{A}$ through $\overline{E}$) to the selection device in addition to the output signals (A through E) of the receiving coils.

2. The inductive angle sensor as in claim 1, wherein the evaluation circuit has a rectifier for eliminating AC portions of the receiving-coil signals coupled from the exciting coils, and wherein both the rectifier and the selection device are comprised of analog switches.

3. The inductive angle sensor as in claim 1, wherein each receiving coil is connected to a common summation point (S) and each receiving coil is connected to the evaluation circuit, and wherein the evaluation circuit evaluates voltages between two respective receiving coils.

4. The inductive angle sensor as in claim 1, wherein the evaluation circuit has an analog digital converter that digitizes the at least one output signal (A through E, $\overline{A}$ through $\overline{E}$) selected by the selection device and sends the digitized output signal to a microcomputer, and wherein the microcomputer controls the selection device utilizing the digitized output signal.

5. An evaluation process for evaluating a position of the rotor element of the inductive angle sensor of claim 1, wherein the evaluation circuit includes a microcomputer and wherein the microcomputer, controls the selection device, to respectively select for evaluation a lowest output signal by value (A through E, $\overline{A}$ through $\overline{E}$) having a positive voltage rise in a given rotational direction of the rotor element.

6. The evaluation process as in claim 5, wherein the microcomputer selects the output signals (A through E, $\overline{A}$ through $\overline{E}$) in a given cyclical sequence.

7. The evaluation process as in claim 5, wherein an entire measuring range of the angle sensor is divided into 2N measuring sections (I–X)(where N=odd number of receiving coils) and N measuring sections (where N=even number of receiving coils), and wherein an output signal for each measuring section (I–X) changes by a signal difference $U_B$, and wherein a digitized output value of an analog digital converter corresponds to a measured output signal value $U_n$ in the measuring range of the coil n currently measured, and wherein the microcomputer calculates the sensor output signal $U_S$ of the angle sensor according to the formula $U_S = U_B \cdot n + U_n$.

8. The evaluation process as in claim 5, wherein the selection device selects a second output signal adjacent the selected at least one output signal that has a lowest value, and wherein the microcomputer calculates a standardized output signal value $U_n$ in a measuring range of the coil n being currently measured, according to the specification $U_n$=a first output signal value.

* * * * *